(12) United States Patent
Han et al.

(10) Patent No.: US 9,471,896 B2
(45) Date of Patent: Oct. 18, 2016

(54) MEMO SYNCHRONIZATION SYSTEM, MOBILE SYSTEM, AND METHOD FOR SYNCHRONIZING MEMO DATA

(75) Inventors: Sang Chul Han, Seongnam-si (KR); Kyungsoo Bae, Seongnam-si (KR); Jung Doo Park, Seongnam-si (KR); Pyoung Oh Yun, Seongnam-si (KR)

(73) Assignee: NHN Corporation, Gyeonggi-do (KR)

( * ) Notice: Subject to any disclaimer, the term of this patent is extended or adjusted under 35 U.S.C. 154(b) by 553 days.

(21) Appl. No.: 13/553,569

(22) Filed: Jul. 19, 2012

(65) Prior Publication Data
US 2013/0024917 A1    Jan. 24, 2013

(30) Foreign Application Priority Data
Jul. 20, 2011    (KR) .................. 10-2011-0072064

(51) Int. Cl.
*G06F 21/00*    (2013.01)
*G06Q 10/10*    (2012.01)

(52) U.S. Cl.
CPC ..................................... *G06Q 10/10* (2013.01)

(58) Field of Classification Search
CPC ... G06Q 10/10; H04L 67/04; H04L 67/1095; H04W 8/22
USPC ..................... 726/2, 4, 5; 707/610
See application file for complete search history.

(56) References Cited

U.S. PATENT DOCUMENTS 7,941,405 B2 *   5/2011   De Coninck ....... G06F 11/1469
                                                                707/652
8,302,162 B1 *  10/2012   Sridharan ......... G06F 17/30073
                                                                709/227
8,838,530 B2 *   9/2014   Kasbekar ............. G06Q 10/107
                                                                707/609
2002/0116405 A1   8/2002   Bodnar et al.
(Continued)

FOREIGN PATENT DOCUMENTS

| IN | WO 2010150277 A2 * | 12/2010 | ........... G06Q 10/107 |
| JP | 2006-228016 A | 8/2006 | |
| JP | 2007-102765 A | 4/2007 | |
| JP | 2008059453 | 3/2008 | |
| KR | 10-2009-0000276 | 7/2009 | |

OTHER PUBLICATIONS

Synchronization of mobile XML databases by utilizing deferred views, Miller et al, IEEE, 2004.*
(Continued)

*Primary Examiner* — Luu Pham
*Assistant Examiner* — Jahangir Kabir
(74) *Attorney, Agent, or Firm* — Harness, Dickey & Pierce, P.L.C.

(57) ABSTRACT

Provided is a memo synchronization system, a mobile system, and a method for synchronizing memo data. The memo synchronization system includes a storage device, an authentication unit configured to authenticate a user by receiving authentication information of the user from a mobile terminal via a memo application installed in the mobile terminal, and a synchronization unit stored on the storage device and configured to synchronize memo data stored in the mobile terminal with memo data stored in a web storage space of an online memo service based on a request for synchronization transmitted from the mobile terminal through the memo application. The request for synchronization includes a synchronization request generated by the memo application according to an event set by the user.

22 Claims, 6 Drawing Sheets

(56) References Cited

U.S. PATENT DOCUMENTS

2002/0194207 A1    12/2002  Bartlett et al.
2015/0326666 A1*   11/2015  Martin ................. H04W 12/06
                                                        707/620

OTHER PUBLICATIONS

Dessy: Search and Synchronization on the Move, Lagerspetz et al, IEEE, 2010.*

Japanese Office Action corresponding to Japanese Patent Application No. 2012-159550 mailed on Dec. 1, 2015.
Nagata Ichihatsu, "Enable to feely explore a cloud on internet Famous Web service user guide—Recording information using Evernote in which the cloud displaces people's memory," PCfan, vol. 18, No. 7, Japan, Mainichi Communications Inc., Jul. 1, 2011, pp. 62-65.
Kano Atko, "Don't need USB or portable HDD anymore! Put data on internet "Work Revolution"—Part 2-Evernote "Online Notepad" executable everywhere," Nikkei PC21, vol. 15, No. 15, Japan, Nikkei BP Inc., Aug. 24, 2010, pp. 110-114.

* cited by examiner

MEMO SYNCHRONIZATION SYSTEM, MOBILE SYSTEM, AND METHOD FOR SYNCHRONIZING MEMO DATA

CROSS-REFERENCE TO RELATED APPLICATION

This application claims priority from and the benefit of Korean Patent Application No. 10-2011-0072064, filed on Jul. 20, 2011, which is hereby incorporated by reference for all purposes as if fully set forth herein.

BACKGROUND

1. Field

Exemplary embodiments of the present invention relate to a memo synchronization system, a mobile system, and a method for synchronizing memo data.

2. Discussion of the Background

A memo refers to a brief written record and electronic memo (hereinafter "memo") that may include information created in a brief message to be sent to others or information to provide a reminder, and may be stored in a storage space of an electronic appliance, such as, for example, a personal computer, a smart phone, and the like.

However, conventional electronic memo applications have problems in providing more convenient memo management systems and applications. For example, a memo stored in each of the storage spaces may be checked through a corresponding medium only. Further, a memo stored in a smart phone may be only checked through the corresponding smart phone, and a memo stored in a web storage space may be only checked through accessing a user terminal to the corresponding web storage space. When a user accesses an available terminal connected to the Internet, the user can check a memo stored in a web storage space. However, when the user is using a mobile terminal, the user may have a difficulty in checking the memo. Further, when the user intends to store a memo written through a mobile terminal and stored in a web storage space, the user may need to re-write the memo through a user terminal connected to the Internet.

Accordingly, a system and method for providing and synchronizing a memo service is suggested herein.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a memo synchronization system, a mobile system, and a method that may synchronize memo data stored in a web storage space of an Internet memo service with memo data stored in a mobile terminal through a memo application.

Exemplary embodiments of the present invention also provide a memo synchronization system, a mobile system, and a method that may synchronize memo data when a condition, such as a request of a user, a change in memo data, a user logging in or logging out, an execution or termination of a memo application, and screen lock of a mobile terminal is met, thereby efficiently synchronizing memo data without wasting resources caused by frequent synchronization events.

Exemplary embodiments of the present invention also provide a memo synchronization system, a mobile system, and a method that may efficiently synchronize memo data even when another user logs in through a memo application on a mobile terminal.

Additional features of the invention will be set forth in the description which follows, and in part will be apparent from the description, or may be learned by practice of the invention.

An exemplary embodiment of the present invention discloses a memo synchronization system including a storage device, an authentication unit configured to authenticate a user by receiving authentication information of the user from a mobile terminal via a memo application installed in the mobile terminal, and a synchronization unit stored on the storage device and configured to synchronize memo data stored in the mobile terminal with memo data stored in a web storage space of an online memo service based on a request for synchronization transmitted from the mobile terminal through the memo application. The request for synchronization includes a request for manual synchronization generated by the memo application corresponding to a predetermined event set by the user.

An exemplary embodiment of the present invention discloses a mobile system including a storage unit configured to store memo data created through a memo application based on data inputted by a user, an authentication information transmitting unit configured to transmit authentication information inputted by the user through the memo application to a server, and a synchronization request transmitting unit configured to transmit, to the server, a request for synchronization generated by the memo application in response to an occurrence of a synchronization event set by the user. The memo data stored in the storage unit is synchronized with memo data stored in a web storage space of an online memo service provided to the user in response to the request for synchronization.

An exemplary embodiment of the present invention discloses a method that uses a processor to synchronize memo data including authenticating a user by receiving authentication information of the user from a mobile terminal through a memo application installed in the mobile terminal, and synchronizing, using the processor, memo data stored in the mobile terminal with memo data stored in a web storage space of an online memo service provided to the user based on a request for synchronization transmitted from the mobile terminal through the memo application. The request for synchronization includes a request for manual synchronization generated by the memo application in response to a synchronization event set by the user.

An exemplary embodiment of the present invention discloses a method that uses a processor to synchronize memo data including storing memo data created through a memo application based on data inputted by a user, transmitting authentication information inputted by the user through the memo application to a server, and transmitting, to the server, a request for synchronization generated by the memo application in response to an occurrence of a synchronization event set by the user. The stored memo data is synchronized with memo data stored in a web storage space of an online memo service provided to the user in response to the request for synchronization.

An exemplary embodiment of the present invention discloses a mobile system including a storage unit configured to store first memo data created by a first user and second memo data created by second user, the first memo data and the second memo data being created by a memo application installed on the mobile system, an authentication information transmitting unit configured to transmit authentication information inputted by the second user to a server through the memo application, and a synchronization request transmitting unit configured to transmit a request for synchronization for the second user in response to a synchronization event. The unsynchronized memo data corresponding to the second user among unsynchronized memo data stored in the storage unit is synchronized with memo data stored in a web storage space of the server provided to the second user.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
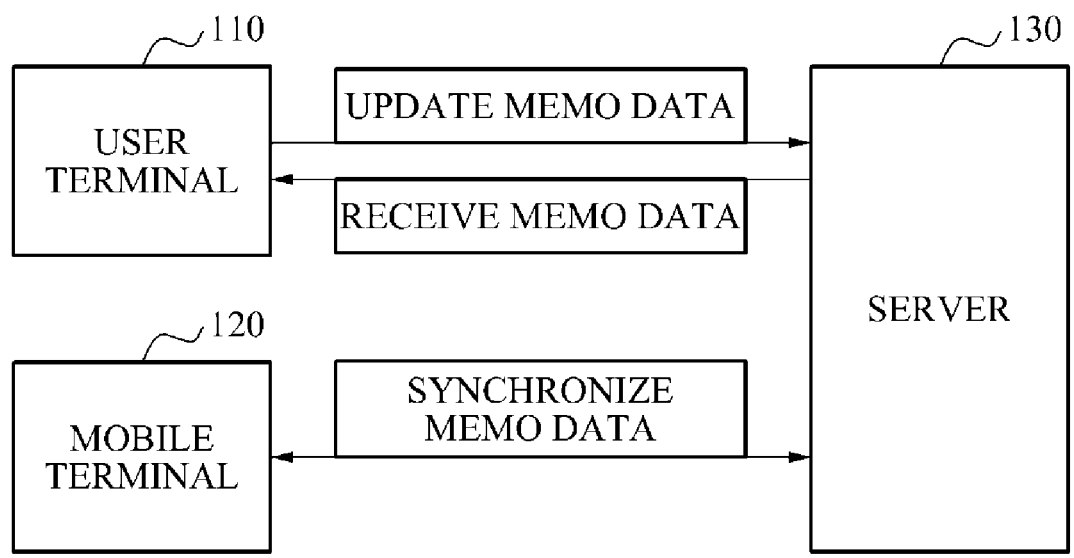
FIG. 1 is a diagram illustrating a memo synchronization system according to an exemplary embodiment of the present invention.

Exemplary embodiments will be described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure is thorough, and will fully convey the scope of the invention to those skilled in the art. Throughout the drawings and the detailed description, unless otherwise described, the same drawing reference numerals are understood to refer to the same elements, features, and structures. The relative size and depiction of these elements may be exaggerated for clarity, illustration, and convenience.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, units, modules, integers, steps, operations, elements, components, etc., but do not preclude the presence or addition of one or more other features, regions, units, modules, integers, steps, operations, elements, components, etc., and/or groups thereof.

It will be understood that for the purposes of this disclosure, "at least one of" will be interpreted to mean any combination of the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, XX). It will be understood that when an element is referred to as being "connected to" another element, it can be directly connected to the other element, or intervening elements may be present. In contrast, when an element is referred to as being "directly connected to" another element, there are no intervening elements present.

FIG. 1 is a diagram illustrating a memo synchronization system according to an exemplary embodiment of the present invention.

Referring to FIG. 1, the memo synchronization system may include a user terminal 110, a mobile terminal 120, and a server 130.

The user terminal 110 may access the server 130 via a website that provides an Internet memo service to receive or update memo data. For example, a user may access the server 130 through the user terminal 110 capable of connecting to the Internet to create new memo data or to edit or delete existing memo data. The memo data may be stored in a web storage space, and, when the user terminal 110 accesses the server 130 via a website, may be provided to the user terminal 110.

The mobile terminal 120 may be where a memo application may be installed so that the user may create, edit, or delete memo data using the memo application installed in the mobile terminal 120. The created memo data may be stored in a storage space of the mobile terminal 120.

The server 130 may synchronize memo data stored in the web storage space with memo data stored in the mobile terminal 120. Aside from the local storage space, the memo created by a memo application of a mobile terminal and locally stored in the mobile terminal may be also stored in a web storage space that may be accessed via online. For example, since memo data created by the user through the user terminal 110 is stored in the web storage space, when the user utilizes the mobile terminal 120, the user cannot check the memo data created through the user terminal 110 and/or stored in the web storage space, until the user accesses the server 130 via a website. On the other hand, since memo data created by the user through the memo application installed in the mobile terminal 120 is stored in the storage space of the mobile terminal 120, when the user does not have the mobile terminal 120, the user may be unable to check the corresponding memo data. To address these problems, the server 130 may synchronize the memo data stored in the two storage spaces to allow the user to check memo data edited by the user terminal 110, and the mobile terminal 120, and memo data stored in the web storage space. The web storage space may be a cloud storage device of an online memo service provider and a user may log in to an assigned web storage space of the cloud storage device via the memo application if the user is authenticated by the provider of an online memo service. The web storage space may be divided and assigned for each registered user. The online memo service may be provided via various communication networks, such as the Internet, a mobile communication network, a short range wireless communication (e.g., Bluetooth®, Near Field Communication, etc.), and the combination thereof. The memo application installed on the mobile device may provide the user with operations of creating, editing, or deleting a memo, and may store the created memo in the mobile device. Further, the memo application may provide an authentication process for the user in connection with the online memo service and the memo stored on the mobile device may be synchronized with memo data stored in a web storage space provided to the user.

Figure 2:
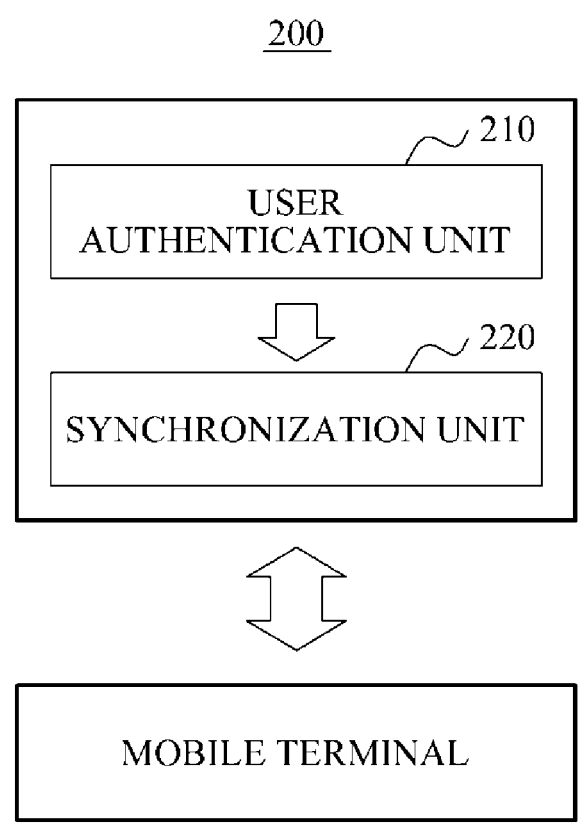
FIG. 2 is a block diagram illustrating an internal configuration of a memo synchronization system according to an exemplary embodiment of the present invention.

FIG. 2 is a block diagram illustrating an internal configuration of the memo synchronization system according to an exemplary embodiment of the present invention. The memo synchronization system 200 may correspond to the server 130 in FIG. 1. As shown in FIG. 2, the memo synchronization system 200 may include a user authentication unit 210 and a synchronization unit 220.

The user authentication unit 210 may authenticate a user by receiving authentication information from a mobile terminal of the user through a memo application installed in the mobile terminal. The mobile terminal may correspond to the mobile terminal 120 in FIG. 1. If the user executes the memo application on the mobile terminal, the user may input identification information (ID) and a password of the user through a user interface provided by the memo application. The mobile terminal may transmit the inputted ID and password as authentication information to the memo synchronization system 200. The user authentication unit 210 of the memo synchronization system 200 may authenticate the user using the received authentication information. Through the user authentication, the user may login to a service, and a web storage space associated with the user may be checked by the user. Further, the memo synchronization system 200 may recognize user information of the mobile terminal registered in the mobile terminal. If the memo synchronization system 200 recognizes the user information of the mobile terminal, the ID and password may not be requested by the memo synchronization system 200.

The synchronization unit 220 may synchronize memo data stored in the mobile terminal with memo data created through an Internet memo service provided to the user and stored in the web storage space of the Internet memo service, based on a request for synchronization transmitted from the mobile terminal through the memo application. The Internet memo service may be a service that a server, e.g., the server 130 in FIG. 1, may provide to the user terminal 110 accessing the server via a website. The memo synchronization system 200 may synchronize the memo data stored in the web storage space assigned to the authenticated user with the memo data stored in the mobile terminal.

The request for synchronization may include a request for manual synchronization generated by the memo application corresponding to a predetermined event set by the user. Certain types of memo data may not be subject to frequent change or frequent synchronization due to characteristics of memo. Thus, synchronization of memo data at a predetermined cycle may result in a waste of resources of the mobile terminal as well as resources of the memo synchronization system 200. A request for synchronization may be generated according to a request of a user and the memo synchronization system 200 may synchronize the memo data stored in the two storage spaces in response to the request for synchronization, thereby using the resources of the mobile terminal as well as the resources of the memo synchronization system 200 in a more efficient manner.

Further, the request for synchronization may include a request for automatic synchronization generated by the memo application through at least one operation of creating, deleting, and editing of the memo data. The generation and transmission of the request for automatic synchronization may be optionally managed by the user through an automatic synchronization option of the memo application. If an automatic synchronization option is selected in a synchronization setting, the request for automatic synchronization may be generated by the memo application and may be transmitted to the memo synchronization system 200 in response to an occurrence of a change in the memo data.

Further, the request for synchronization may include a request for automatic synchronization generated by the memo application through at least one operation of the user logging in and logging out based on the authentication information, execution of the memo application, termination of the memo application, and screen lock of the mobile terminal. Thus, the user may select a setting for synchronization of the memo data stored in the two storage spaces when a desired condition set by the user is met through the automatic synchronization option.

The synchronization of the memo data in the mobile terminal may be executed in foreground if the memo application is being executed, and may be executed in background if the memo application is terminated.

The condition for generating the request for synchronization may be represented by the following Table 1:

TABLE 1

| Manual Synchronization | Automatic Synchronization |
|---|---|
| Occurrence of a predetermined event set by user | Creating memo data<br>Editing memo data<br>Deleting memo data<br>Execution of memo application<br>Termination of memo application<br>Screen lock of mobile terminal<br>User logging in<br>User logging out |

The predetermined event set by the user may include, for example, an event of flicking a list of memo data, an event of touching a synchronization area, and an event of selecting a synchronization option in settings.

A memo written by a first user through the mobile terminal may be stored in the mobile terminal and may not be stored the web storage space if an automatic synchronization option is selected or the first user does not directly generate an event for synchronization. When unsynchronized memo data is stored in the mobile terminal, a second user may log in through the mobile terminal of the user. While the second user is logged in, it is preferable that the memo data created by the first user is prevented from being synchronized with memo data stored in a web storage space of the second user. If the second user logs in through the mobile terminal of the first user, the memo synchronization system 200 may synchronize memo data created after login of the second user with memo data stored in a web storage space of the second user. Thus, memo data created by the second user logging in through the memo application on the mobile terminal of the first user may be synchronized with memo data stored in a web storage space of an Internet memo service provided to the second user. Further, a message indicating that unsynchronized memo data created by the first user may be displayed on the mobile terminal. Along with the message, a user interface for identifying whether to proceed with synchronization may be further provided. Further, if a synchronization proceeds with respect to the second user, only the memo data created by the second user may be synchronized while the memo data of the first user is excluded from the synchronization process with respect to the second user.

Figure 3:
FIG. 3 is a diagram illustrating an example of a change in a display of a mobile terminal according to an exemplary embodiment of the present invention.

FIG. 3 is a diagram illustrating an example of a change in a display of a mobile terminal according to an exemplary embodiment of the present invention.

Referring to FIG. 3, a first display 310 and a second display 320 illustrate a portion of the display of the mobile terminal. The first display 310 illustrates twelve memo data currently being stored and synchronized. The second display 320 illustrates that a fifth memo data 330 is added after a synchronization process and the number of stored memo data changes from twelve to thirteen.

Figure 4:
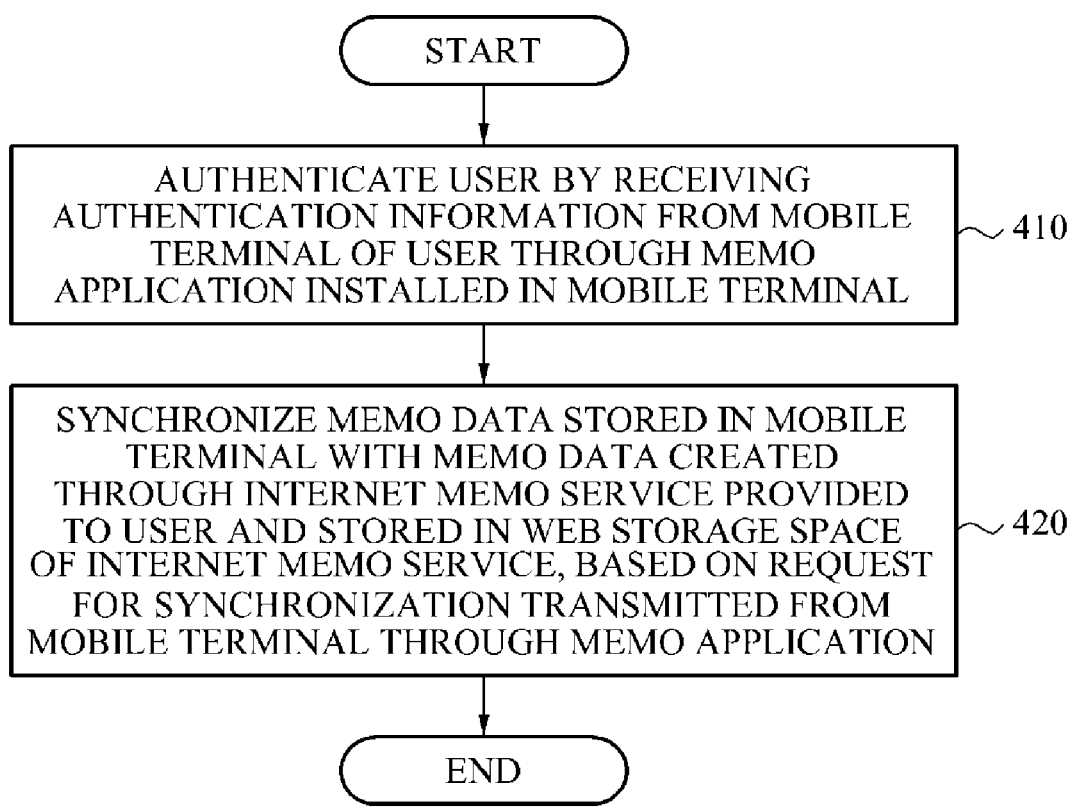
FIG. 4 is a flowchart illustrating a memo synchronization method performed by a memo synchronization system according to an exemplary embodiment of the present invention.

FIG. 4 is a flowchart illustrating a memo synchronization method performed by the memo synchronization system according to an exemplary embodiment of the present invention. FIG. 4 will be described as if performed by the memo synchronization system 200 shown in FIG. 2, but is not limited as such.

In operation 410, the memo synchronization system 200 may authenticate a user by receiving authentication information from a mobile terminal of the user through a memo application installed in the mobile terminal. For example, the mobile terminal may correspond to the mobile terminal 120 shown in FIG. 1. After the user executes the memo application on the mobile terminal, the user may input an ID and a password of the user through a user interface provided by the memo application. The mobile terminal may transmit the inputted ID and password as authentication information to the memo synchronization system 200. The memo synchronization system 200 may authenticate the user using the received authentication information. Through the user authentication, the user may login to a service, and a web storage space associated with the user may be checked by the user.

In operation 420, the memo synchronization system 200 may synchronize memo data stored in the mobile terminal with memo data created through an Internet memo service provided to the user and stored in the web storage space of the Internet memo service, based on a request for synchronization transmitted from the mobile terminal through the memo application. The Internet memo service may be a service that the server 130 shown in FIG. 1 provides to the user terminal 110 accessing the server 130 through a website. The memo synchronization system 200 may synchronize the memo data stored in the web storage space assigned to the authenticated user with the memo data stored in the mobile terminal.

The request for synchronization may include a request for manual synchronization generated by the memo application corresponding to an event set by the user. Certain types of memo data may not be subject to frequent change due to characteristics of memo. Thus, periodic synchronization of memo data at a predetermined cycle may result in a waste of resources of the mobile terminal as well as resources of the memo synchronization system 200. To increase resource utilization efficiencies, the user terminal 110 or the mobile terminal 120 may generate a request for synchronization according to a request of the user and may enable the memo synchronization system 200 to synchronize the memo data stored in the two storage spaces in response to the request for synchronization, thereby using the resources of the mobile terminal as well as the resources of the memo synchronization system 200 in a more efficient manner.

Further, the request for synchronization may include a request for automatic synchronization generated by the memo application through at least one operation of creating, deleting, and editing of the memo data. The generation and transmission of the request for automatic synchronization may be optionally managed by the user by selecting an automatic synchronization option of the memo application. For example, if the user sets an automatic synchronization option, when a change in the memo data occurs, the request for automatic synchronization generated by the memo application may be transmitted to the memo synchronization system 200.

The request for synchronization may further include a request for automatic synchronization generated by the memo application through at least one operation of the user logging in and logging out based on the authentication information, execution of the memo application, termination of the memo application, and screen lock of the mobile terminal. The user may set a condition for synchronization of the memo data stored in the two storage spaces such that the condition triggers a synchronization procedure through an automatic synchronization option without allowing frequent synchronization processes.

Further, the synchronization of the memo data in the mobile terminal may be executed in foreground if the memo application is being executed, and may be executed in background if the memo application is terminated.

Under the automatic synchronization option, a memo written by the user through the mobile terminal may be stored in the mobile terminal without storing the memo in the web storage space so long as the condition of an automatic synchronization option is met or the user does not directly generate an event for synchronization. When unsynchronized memo data is stored in the mobile terminal, another user ("second user") may log in to a memo application through the mobile terminal of the user ("first user"). If the second user logs in to the memo application, the memo data created by the first user may be preserved and may not be synchronized with memo data stored in a web storage space of the second user. The memo data created by the first user may include a field that indicates the authorized user of the memo data, and thus the unsynchronized memo data of the first user may be distinguished from the unsynchronized memo data of another user. When the second user logs in to the memo application through the mobile terminal of the first user, the memo synchronization system 200 may synchronize memo data created after login of the second user with memo data stored in a web storage space of the second user. Thus, memo data created by second user logging in to the memo application on the mobile terminal of the first user may be synchronized with memo data stored in a web storage space of an Internet memo service provided to the second user. Further, a message indicating that the memo data created by the first user and/or a message indicating that the memo data created by the second user before synchronization exists may be displayed on the mobile terminal. With the message, a user interface for identifying whether to perform synchronization may be further provided. During the synchronization process, the memo data created by the second user may be subject to synchronization so that the memo data of the first user may be excluded from synchronization.

Hereinafter, synchronization from the mobile terminal perspective will be described with reference to FIG. 5 and FIG. 6.

Figure 5:
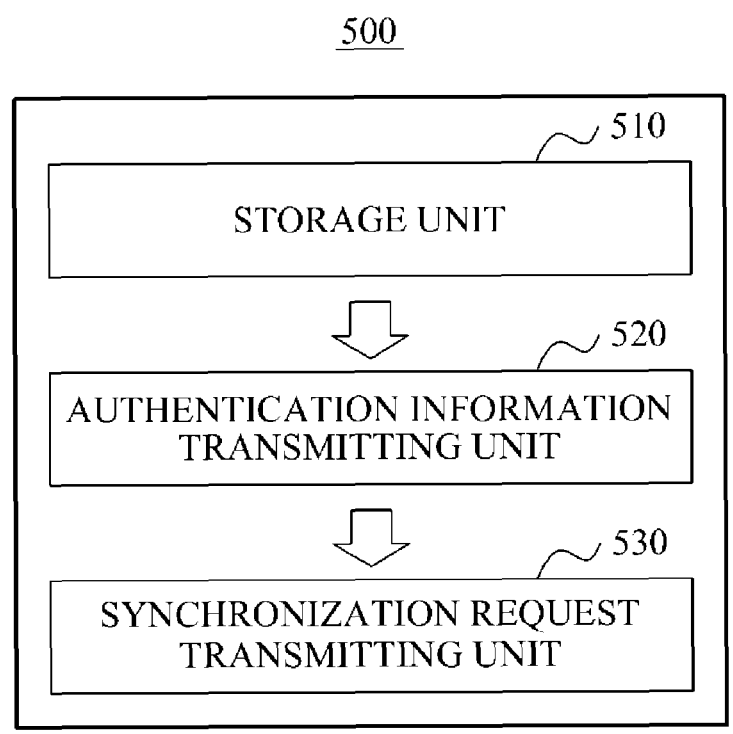
FIG. 5 is a block diagram illustrating an internal configuration of a mobile system according to an exemplary embodiment of the present invention.

FIG. 5 is a block diagram illustrating an internal configuration of a mobile system according to an exemplary embodiment of the present invention. The mobile system 500 may correspond to the mobile terminal shown in FIG. 1, FIG. 2, FIG. 3, or FIG. 4. As shown in FIG. 5, the mobile system 500 may include a storage unit 510, an authentication information transmitting unit 520, and a synchronization request transmitting unit 530.

The storage unit 510 may store and maintain memo data created through a memo application, based on data inputted by a user. As described above, the mobile system 500 may be at a location in which the memo application may be installed so that the user may create, edit, and delete the memo data using the memo application. The memo data may be stored in a storage device of the mobile system 500.

The authentication information transmitting unit 520 may transmit authentication information inputted by the user through the memo application to a server. The server may correspond to the memo synchronization system 200 shown in FIG. 2. If the authentication information transmitting unit 520 transmits the authentication information to the server, the server may authenticate the user by receiving and checking the authentication information. Further, the authentication information may be used in searching for memo data stored in a web storage space in association with the user. Further, the authentication information transmitting unit 520 may distinguish first unsynchronized memo data of a first user from unsynchronized memo data of the other user based on the field indicating the first user included in the first unsynchronized memo data.

The synchronization request transmitting unit 530 may transmit, to the server, a request for synchronization generated by the memo application corresponding to an event set by the user. The stored memo data of the mobile system 500 may be synchronized with memo data stored in a web storage space of an Internet memo service provided to the user. In response to the request for synchronization, the server may synchronize the memo data stored in the mobile system 500 with memo data created by an Internet memo service provided to the user and stored in the web storage space of the Internet memo service, based on the request for synchronization transmitted to the server. The synchronization request transmitting unit 530 may transmit, to the server, a request for synchronization generated by the memo application through at least one operation of creating, deleting, and editing of the memo data. Further, the synchronization request transmitting unit 530 may transmit, to the server, a request for synchronization generated by the memo application through at least one operation of the user logging in and logging out based on the authentication information, execution of the memo application, termination of the memo application, and screen lock of the mobile terminal. The synchronization may be executed in foreground if the memo application is being executed, and may be executed in background if the memo application is terminated.

If an automatic synchronization option is selected, a memo written by the user through the mobile system 500 may be stored in the mobile system 500 and may remain unsynchronized if a synchronization condition is not satisfied or the user does not directly generate an event for synchronization. When unsynchronized memo data is stored in the mobile system 500, a second user may log in to a memo application through the mobile system 500 of the user ("first user"). The memo data created by the first user may remain unsynchronized and the memo data created by the second user may be synchronized with memo data stored in a web storage space of the second user. The memo data of the first user may be distinguished from memo data of other users based on a field indicating the authorized user of the memo data. If a second user logs in through the mobile system 500 of the first user, the server may synchronize memo data created after login of the second user with memo data stored in a web storage space of the second user. Memo data created by a user logging in to the memo application on the mobile system 500 may be synchronized with memo data stored in a web storage space of an Internet memo service provided to the user. Further, a message indicating that the memo data created by the user before synchronization exists may be displayed on the mobile system 500. Along with the message, a user interface for identifying whether to perform synchronization may be further provided. During the synchronization process, memo data created by the user logged in to the memo application may be distinguished from other unsynchronized memo data for synchronization so that the unsynchronized memo data of users not logged in to the memo application may be excluded from synchronization.

Figure 6:
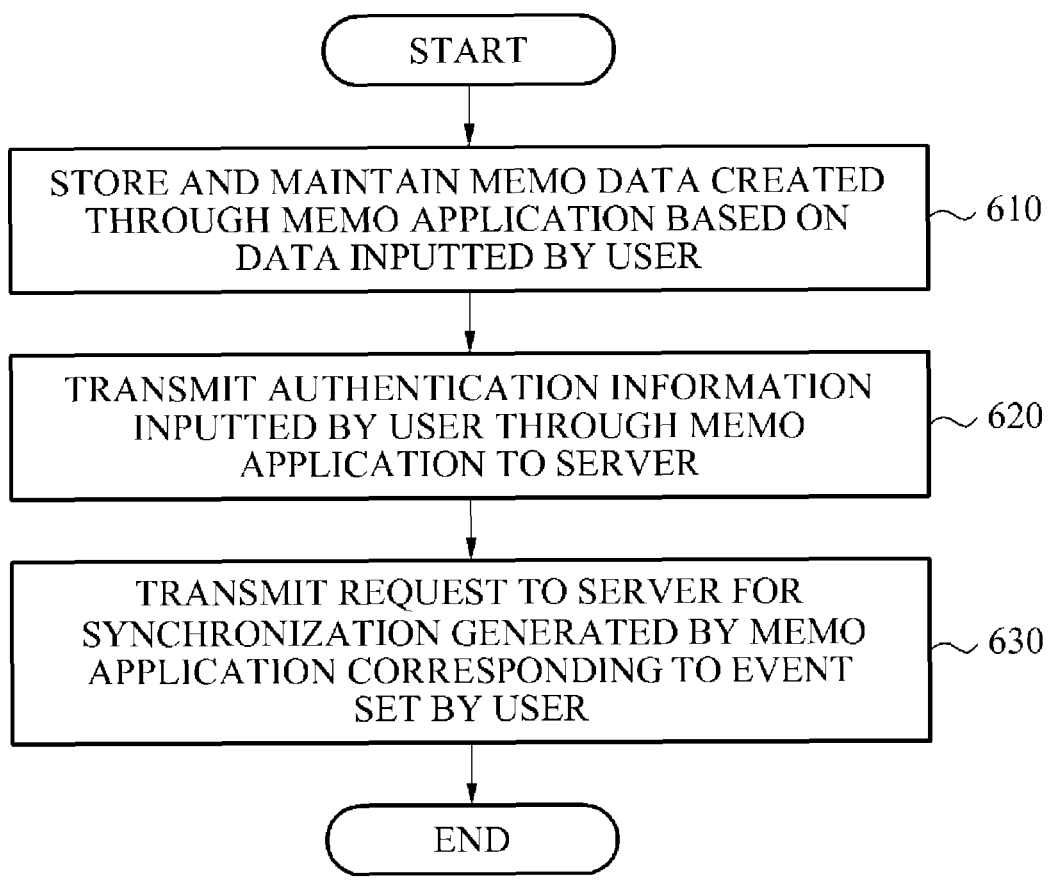
FIG. 6 is a flowchart illustrating a memo synchronization method performed by a mobile system according to an exemplary embodiment of the present invention.

FIG. 6 is a flowchart illustrating a memo synchronization method performed by the mobile system according to an exemplary embodiment of the present invention. FIG. 6 will be described as if performed by the mobile system shown in FIG. 5, but is not limited as such In operation 610, the mobile system 500 may store and maintain memo data created through a memo application, based on data inputted by a user. As described above, the mobile system 500 may be at a location in which the memo application may be installed so that the user may create, edit, and delete the memo data using the memo application. In this instance, the memo data may be stored in a storage device of the mobile system 500.

In operation 620, the mobile system 500 may transmit authentication information to a server. The authentication information may be inputted by the user through the memo application. The server may correspond to the memo synchronization system 200 shown in FIG. 2. If the mobile system 500 transmits the authentication information to the server, the server may authenticate the user by receiving and checking the authentication information. The authentication information may be used in searching for memo data, associated with the user, stored in a web storage space.

In operation 630, the mobile system 500 may transmit, to the server, a request for synchronization generated by the memo application corresponding to an event set by the user. The stored memo data may be synchronized with memo data stored in a web storage space of an Internet memo service provided to the user. The server may synchronize the memo data stored in the mobile system 500 with memo data created through an Internet memo service provided to the user and stored in a web storage space of the Internet memo service, based on a request for synchronization transmitted to the server. The mobile system 500 may transmit, to the server, a request for synchronization generated by the memo application through at least one operation of creating, deleting, and editing of the memo data. Also, the mobile system 500 may transmit, to the server, a request for synchronization generated by the memo application through at least one operation of the user logging in and logging out based on the authentication information, execution of the memo application, termination of the memo application, and screen lock of the mobile terminal. The synchronization may be executed in foreground if the memo application is being executed, and may be executed in background if the memo application is terminated.

Under an automatic synchronization option, a memo written by the user through the mobile system 500 may be stored in the mobile system 500 and may not be synchronized if a condition for synchronization is not satisfied or the user does not directly generate an event for synchronization. When unsynchronized memo data of a first user is stored in the mobile system 500, another user may log in to the memo application through the mobile system 500 of the first user. The memo data created by the first user may remain unsynchronized and the memo data created by the second user may be synchronized with memo data stored in a web storage space of the second user. When a second user logs in to the memo application through the mobile system 500 of the first user, the server may synchronize memo data created after login of the second user with memo data stored in a web storage space of the second user. The memo data created by the second user logging in through the memo application on the mobile system 500 may be synchronized with memo data stored in a web storage space of an Internet memo service provided to the second user. Further, a message indicating that the memo data created by the first user before synchronization exists may be displayed on the mobile system 500. Along with the message, a user interface for identifying whether to perform synchronization may be further provided. During the synchronization process, the memo data created by the second user may be distinguished for the synchronization so that the memo data of the first user may be excluded from the synchronization.

According to the exemplary embodiments of the present invention, memo data stored in a web storage space of an Internet memo service may be synchronized with memo data stored in a mobile terminal through a memo application. According to the exemplary embodiments of the present invention, memo data may be synchronized when a specific condition is met, such as, for example, a request of a user, a change in memo data, a user logging in and logging out, execution of a memo application, termination of a memo application, and screen lock of a mobile terminal, thereby efficiently synchronizing memo data not subject to frequent synchronization. According to the exemplary embodiments of the present invention, memo data may be efficiently synchronized even when another user logs in through a memo application on a mobile terminal of an original user.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of non-transitory computer-readable media include magnetic media such as hard disks, floppy disks, and magnetic tape; optical media such as CD ROM discs and DVD; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A memo synchronization system, comprising:
a memory having computer readable instructions stored thereon;
at least one computer processor configured to execute the computer readable instructions to,
authenticate a first user by receiving authentication information of the first user from a mobile terminal via a memo application installed in the mobile terminal,
synchronize first memo data stored in the mobile terminal with memo data stored in a web storage space of an online memo service based on a request for synchronization transmitted from the mobile terminal through the memo application, the request for synchronization comprising a synchronization request generated by the memo application according to an occurrence of a non-periodic event selected by the first user,
the first memo data is associated with the first user, and the web storage space is associated with the first user,
determine whether unsynchronized first memo data created by the first user is stored on the mobile terminal when a second user is authenticated via the memo application on the mobile terminal,
display a message indicating the determination result to the second user on a display of the mobile terminal,
authenticate the second user by receiving authentication information of the second user from the mobile terminal via the memo application installed in the mobile terminal, and
synchronize second memo data associated with the second user stored in the mobile terminal with memo data stored in a web storage space associated with the second user of the online memo service based on a request for synchronization transmitted from the mobile terminal through the memo application, the request for synchronization comprising a synchronization request generated by the memo application according to an occurrence of a non-periodic event selected by the second user.

2. The memo synchronization system of claim 1, wherein the non-periodic event includes at least one operation of creating, deleting, and editing of the memo data stored in the mobile terminal or the memo data stored in the web storage space.

3. The memo synchronization system of claim 1, wherein non-periodic event includes at least one operation of a user logging in or logging out based on the authentication information, an execution of the memo application of the mobile terminal, a termination of the memo application, and an occurrence of screen lock of the mobile terminal.

4. The memo synchronization system of claim 3, wherein the synchronization of the memo data stored in the mobile terminal is executed in foreground when the memo application is being executed and executed in background when the memo application is terminated.

5. The memo synchronization system of claim 1, wherein memo data created by the second user logging in to the online memo service through the memo application on the mobile terminal is synchronized with memo data stored in a web storage space of the online memo service provided to the second user.

6. A mobile system, comprising:
a memory having computer readable instructions stored thereon; and
at least one computer processor configured to execute the computer readable instructions to,
store, in the memory, first memo data created through a memo application based on data inputted by a first user,
transmit authentication information inputted by the first user through the memo application to a server,
transmit, to the server, a request for synchronization generated by the memo application in response to an occurrence of a synchronization event, the synchronization event being a non-periodic event selected by the first user,
wherein the first memo data stored in the memory is synchronized with memo data stored in a web storage space of an online memo service provided to the first user in response to the request for synchronization,
the first memo data is associated with the first user, and the web storage space is associated with the first user,
determine whether unsynchronized first memo data created by the first user is stored in the memory when a second user is authenticated through the memo application,
display a message indicating the determination result to the second user,
authenticate the second user by receiving authentication information of the second user from the mobile terminal via the memo application installed in the mobile terminal, and
synchronize second memo data associated with the second user stored in the mobile terminal with memo data stored in a web storage space associated with the second user of the online memo service based on a request for synchronization transmitted from the mobile terminal through the memo application, the request for synchronization comprising a synchronization request generated by the memo application according to an occurrence of a non-periodic event selected by the second user.

7. The mobile system of claim 6, wherein the at least one computer processor is further configured to execute the computer readable instructions to transmit, to the server, a request for synchronization generated by the memo application in response to an occurrence of at least one operation of creating, deleting, and editing of the memo data.

8. The mobile system of claim 6, wherein the at least one computer processor is further configured to execute the computer readable instructions to transmit, to the server, a request for synchronization generated by the memo application in response to an occurrence of at least one operation of a user logging in or logging out based on the authentication information, an execution of the memo application, a termination of the memo application, and an occurrence of screen lock of the mobile terminal.

9. The mobile system of claim 8, wherein the synchronization is executed in foreground when the memo application is being executed and executed in background when the memo application is terminated.

10. The mobile system of claim 6, wherein memo data created by the second user logging in through the memo application is synchronized with memo data stored in a web storage space of the online memo service provided to the second user.

11. A method executed using at least one computer processor to synchronize memo data, comprising:
authenticating, using the at least one computer processor, a first user by receiving authentication information of the first user from a mobile terminal through a memo application installed in the mobile terminal; and
synchronizing, using the at least one computer processor, first memo data stored in the mobile terminal with memo data stored in a web storage space of an online memo service provided to the first user, based on a request for synchronization transmitted from the mobile terminal through the memo application, the request for synchronization comprising a synchronization request generated by the memo application according to an occurrence of a non-periodic event selected by the first user,
the first memo data is associated with the first user, and the web storage space is associated with the first user;
determining, using the at least one computer processor, whether unsynchronized first memo data created by the first user is stored in the mobile terminal when a second user is authenticated through the memo application installed on the mobile terminal;
displaying, using the at least one computer processor, a message indicating the determination result to the second user on a display of the mobile terminal;
authenticating the second user by receiving authentication information of the second user from the mobile terminal via the memo application installed in the mobile terminal; and
synchronizing second memo data associated with the second user stored in the mobile terminal with memo data stored in a web storage space associated with the second user of the online memo service based on a request for synchronization transmitted from the mobile terminal through the memo application, the request for synchronization comprising a synchronization request generated by the memo application according to an occurrence of a non-periodic event selected by the second user.

12. The method of claim 11, wherein the request for synchronization comprises a request for automatic synchronization generated by the memo application in response to an occurrence of at least one operation of creating, deleting, and editing of the memo data.

13. The method of claim 11, wherein the request for synchronization comprises a request for automatic synchronization generated by the memo application in response to an occurrence of at least one operation of a user logging in or logging out based on the authentication information, an execution of the memo application, a termination of the memo application, and an occurrence of screen lock of the mobile terminal.

14. The method of claim 11, wherein memo data created by the second user logging in to the online memo service through the memo application on the mobile terminal is synchronized with memo data stored in a web storage space of the online memo service provided to the second user.

15. A method executed using at least one computer processor to synchronize memo data, comprising:
storing, using the at least one computer processor, first memo data created through a memo application based on data inputted by a first user;

transmitting, using the at least one computer processor, authentication information inputted by the first user through the memo application to a server;
transmitting, using the at least one computer processor, to the server a request for synchronization generated by the memo application in response to an occurrence of a synchronization event, the synchronization event being a non-periodic event selected by the first user, wherein the stored first memo data is synchronized with memo data stored in a web storage space of an online memo service provided to the first user in response to the request for synchronization,
the first memo data is associated with the first user, and the web storage space is associated with the first user;
determining, using the at least one computer processor, whether unsynchronized first memo data created by the first user is stored on the mobile terminal when a second user is authenticated through the memo application on the mobile terminal;
displaying, using the at least one computer processor, a message indicating the determination result to the second user on a display of the mobile terminal;
authenticating the second user by receiving authentication information of the second user from the mobile terminal via the memo application installed in the mobile terminal; and
synchronizing second memo data associated with the second user stored in the mobile terminal with memo data stored in a web storage space associated with the second user of the online memo service based on a request for synchronization transmitted from the mobile terminal through the memo application, the request for synchronization comprising a synchronization request generated by the memo application according to an occurrence of a non-periodic event selected by the second user.

16. The method of claim 15, further comprising transmitting, using the at least one computer processor, to the server a request for synchronization generated by the memo application in response to an occurrence of at least one operation of creating, deleting, and editing of the memo data.

17. The method of claim 15, further comprising transmitting, using the at least one computer processor, to the server a request for synchronization generated by the memo application in response to an occurrence of at least one operation of a user logging in or logging out based on the authentication information, an execution of the memo application, a termination of the memo application, and an occurrence of screen lock of the mobile terminal.

18. The method of claim 15, wherein
the message is a message indicating that the unsynchronized first memo data created by the first user is present; and
the displaying includes displaying the message when the second user logs in to the online memo service through the memo application.

19. The method of claim 15, further comprising:
storing, using the at least one computer processor, second memo data created by the second user logging in to the online memo service through the memo application; and
synchronizing, using the at least one computer processor, with second memo data stored in the web storage space of the online memo service associated with the second user.

20. A non-transitory computer-readable recording medium comprising an executable program, which when executed by at least one computer processor, causes the at least one computer processor to:
authenticate a first user by receiving authentication information of the first user from a mobile terminal through a memo application installed in the mobile terminal;
synchronize first memo data stored in the mobile terminal with memo data stored in a web storage space of an online memo service provided to the first user, based on a request for synchronization transmitted from the mobile terminal through the memo application, the request for synchronization comprising a synchronization request generated by the memo application according to an occurrence of a non-periodic event selected by the first user,
the first memo data is associated with the first user, and the web storage space is associated with the first user;
determine unsynchronized first memo data created by the first user is stored on the mobile terminal when a second user is authenticated through the memo application on the mobile terminal;
display a message indicating the determination result to the second user on a display of the mobile terminal;
authenticate the second user by receiving authentication information of the second user from the mobile terminal via the memo application installed in the mobile terminal; and
synchronize second memo data associated with the second user stored in the mobile terminal with memo data stored in a web storage space associated with the second user of the online memo service based on a request for synchronization transmitted from the mobile terminal through the memo application, the request for synchronization comprising a synchronization request generated by the memo application according to an occurrence of a non-periodic event selected by the second user.

21. A mobile system, comprising:
a memory having computer readable instructions stored thereon;
at least one computer processor configured to execute the computer readable instructions to,
store, in the memory, first memo data created by a first user and second memo data created by a second user, the first memo data and the second memo data being created by a memo application installed on the mobile system,
determine whether a request for synchronization of the first memo data has been received from the first user,
based on results of the determination, synchronize the first memo data in a web storage space of a server provided to the first user,
transmit authentication information inputted by the second user to the server through the memo application,
transmit a request for synchronization for the second user in response to a synchronization event, the synchronization event being a non-periodic event that is selected by the second user,
wherein unsynchronized memo data corresponding to the second user among unsynchronized memo data stored in the memory is synchronized with memo data stored in a web storage space of the server provided to the second user,
the second memo data is associated with the second user, and
the web storage space is associated with the second user,
determine whether unsynchronized first memo data created by the first user is stored on the mobile terminal when the second user is authenticated through the memo application on the mobile terminal, display a message indicating results of the determination to the second user on a display device of the mobile terminal.

22. The mobile system of claim 21, wherein the display device is configured to display the unsynchronized memo data corresponding to the second user; and wherein the at least one computer processor is further configured to execute the computer readable instructions to distinguish the unsynchronized memo data corresponding to the second user from the unsynchronized memo data corresponding to the other user.

\* \* \* \* \*